(12) United States Patent
Sato

(10) Patent No.: US 6,497,164 B1
(45) Date of Patent: Dec. 24, 2002

(54) ULTRASONIC VIBRATION CUTTING TOOL AND PRODUCTION METHOD THEREOF

(75) Inventor: Shigeru Sato, Fukuoka-ken (JP)

(73) Assignee: Ultex Corporation, Fukuoka-ken (JP)

( * ) Notice: Subject to any disclaimer, the term of this patent is extended or adjusted under 35 U.S.C. 154(b) by 0 days.

(21) Appl. No.: 09/722,748

(22) Filed: Nov. 28, 2000

(30) Foreign Application Priority Data

Dec. 9, 1999 (JP) .......................................... 11-350837

(51) Int. Cl.[7] ................................................ B24B 1/00
(52) U.S. Cl. ............................. 76/115; 51/295; 451/63; 451/165
(58) Field of Search ..................... 83/425.3, 508.3; 82/158; 125/15; 451/295, 63; 76/104.1, 115

(56) References Cited

U.S. PATENT DOCUMENTS

| | | | | |
|---|---|---|---|---|
| 4,787,362 A | * | 11/1988 | Boucher et al. | 125/15 |
| 4,911,044 A | * | 3/1990 | Mishiro et al. | 82/158 |
| 5,259,149 A | * | 11/1993 | Klievoneit et al. | 451/63 |
| 5,316,559 A | * | 5/1994 | Klievoneit et al. | 51/295 |
| 6,058,823 A | * | 5/2000 | Michoud | 83/508.3 |
| 6,098,514 A | * | 8/2000 | Sato et al. | 83/425.3 |

OTHER PUBLICATIONS

Corona Publishing Co., Ltd "Ultrasonic Engineering", dated Jan. 30, 1993, Japanese Literature, p. 218, section 6.4.1.

* cited by examiner

*Primary Examiner*—Hwei-Siu Payer
(74) *Attorney, Agent, or Firm*—Sughrue Mion, PLLC

(57) ABSTRACT

A ultrasonic vibration cutting tool which can optimize materials as in a separate type and can improve the transmission efficiency of ultrasonic vibration as in an integrated type. The ultrasonic vibration cutting tool comprises a ring-shaped projection and a blade essentially composed of diamond and held by the ring-shaped projection both of which are formed on the peripheral surface of a vibration conversion portion provided on a resonator, and the outer diameter of the blade is set larger than the outer diameter of the ring-shaped projection.

3 Claims, 3 Drawing Sheets

INITIAL SHAPE FORMING STEP

MASKING STEP

FIG. 2(c) PLATING WITH POWER SOURCE

Figure 1:
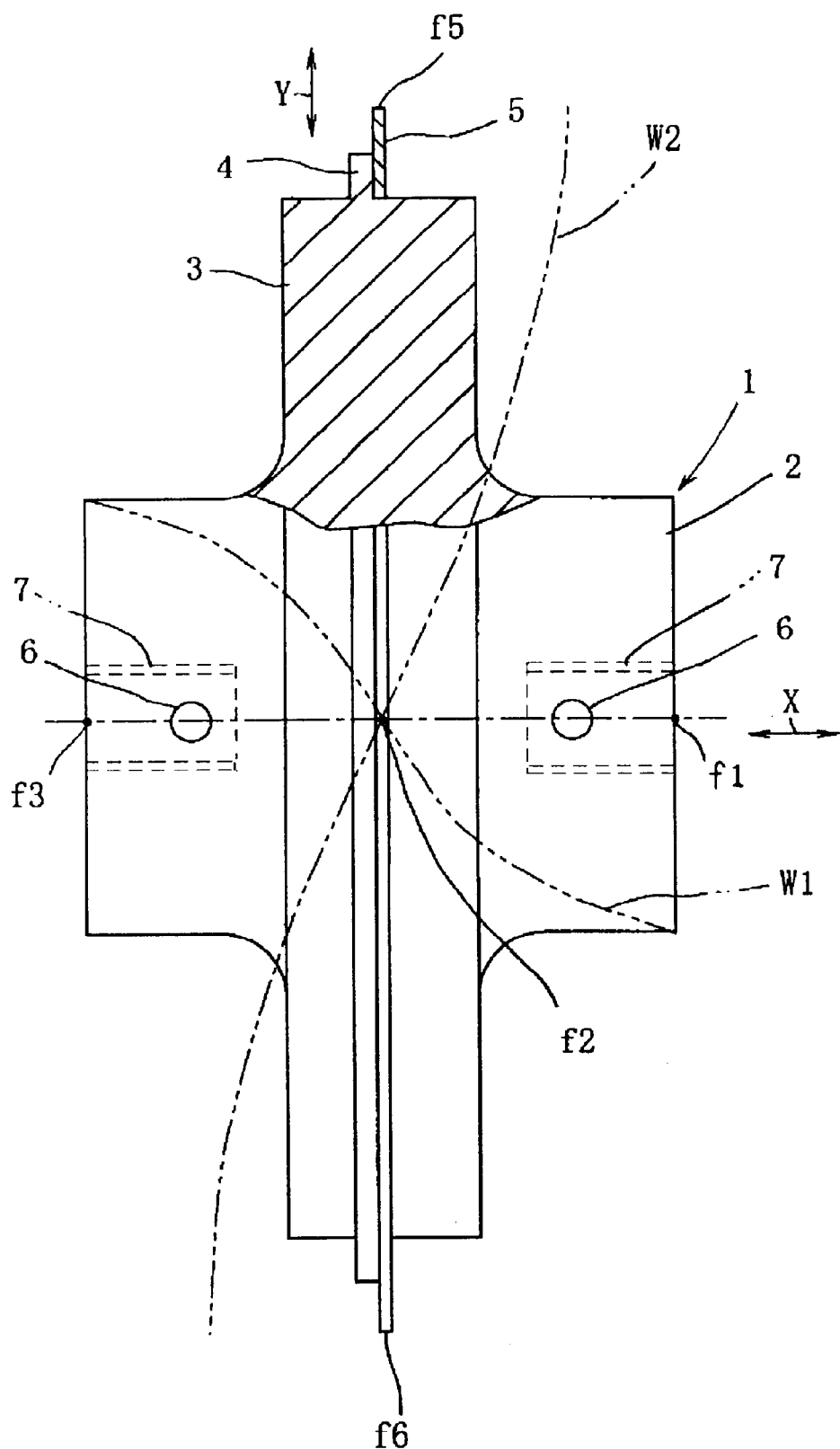

32; PLATING SOLUTION
[NICKEL SULFATE SOLUTION + DIAMOD POWDERS]

COMPLETION OF PLATING

ETCHING

ULTRASONIC VIBRATION CUTTING TOOL AND PRODUCTION METHOD THEREOF

BACKGROUND OF THE INVENTION

1. Field of the Invention

The present invention relates to an ultrasonic vibration cutting tool and to a production method thereof.

2. Description of the Prior Art

A cutting tool making use of ultrasonic vibration is described at page 218 of "Ultrasonics" published by Corona Co., Ltd. in Jun. 30, 1999.

Ultrasonic vibration cutting tools are divided into two types: an integrated type in which a blade projecting outward from the peripheral surface of a resonator is integrated with the resonator and a separate type in which a disk-like blade is attached to a resonator. Since the blade and the resonator are made from the same material in the case of the integrated type, when the blade is formed from a material best suited for a member to be cut, the material of the resonator may not have excellent acoustic characteristics, or when the resonator is formed from a material having excellent acoustic. characteristics, the material of the blade has poor compatibility with the member to be cut. Therefore, the material of the blade is limited inevitably. In the case of the separate type, the blade and the resonator can be formed from different materials. For example, the blade is formed from a material best suited for a member to be cut and the resonator is formed from a material having excellent acoustic characteristics. However, since the blade is attached to the resonator, the transmission efficiency of ultrasonic vibration from the resonator to the blade becomes worse inevitably compared with the integrated type.

SUMMARY OF THE INVENTION

Then, the present invention provides an ultrasonic vibration rotary cutting tool which can optimize materials as in a separate type and, can improve the transmission efficiency of ultrasonic vibration as in an integrated type, as well as a production method thereof.

According to an aspect of the present invention, there is provided an ultrasonic vibration cutting tool comprising a ring-shaped projection and a blade essentially composed of diamond and held by the ring-shaped projection, all of which are formed on the peripheral surface of a vibration. conversion portion provided on a resonator, wherein the outer diameter of the blade is made larger than the outer diameter of the ring-shaped projection. According to this invention, the blade is formed from a material best suited for a member to be cut regardless of the resonator and integrated with the resonator. Therefore, the optimization of materials as in the separate type and the improvement of the transmission efficiency of ultrasonic vibration as in the separate type can be made possible.

According to another aspect of the present invention, there is provided a method of producing an ultrasonic vibration cutting tool, the method comprising the steps of immersing a resonator having a vibration conversion portion and a ring-shaped projection in a plating solution obtaining diamond powders and growing a blade essentially composed of diamond with the ring-shaped projection as a seed by electroplating. According to this invention, an ultrasonic vibration cutting tool which can optimize materials as in the separate type and can improve the transmission efficiency of ultrasonic vibration as in the integrated type can be easily produced.

In the above invention, if the peripheral portion of the ring-shaped projection is removed after the growth of the blade so that the ring-shaped projection is located inside the peripheral portion of the blade, the outer diameter of the blade can be set properly.

The above and other objects, advantages and features of the present invention will become more apparent from the following description when taken into conjunction with the accompanying drawings.

BRIEF DESCRIPTION OF THE ACCOMPANYING DRAWINGS

Figure 3:
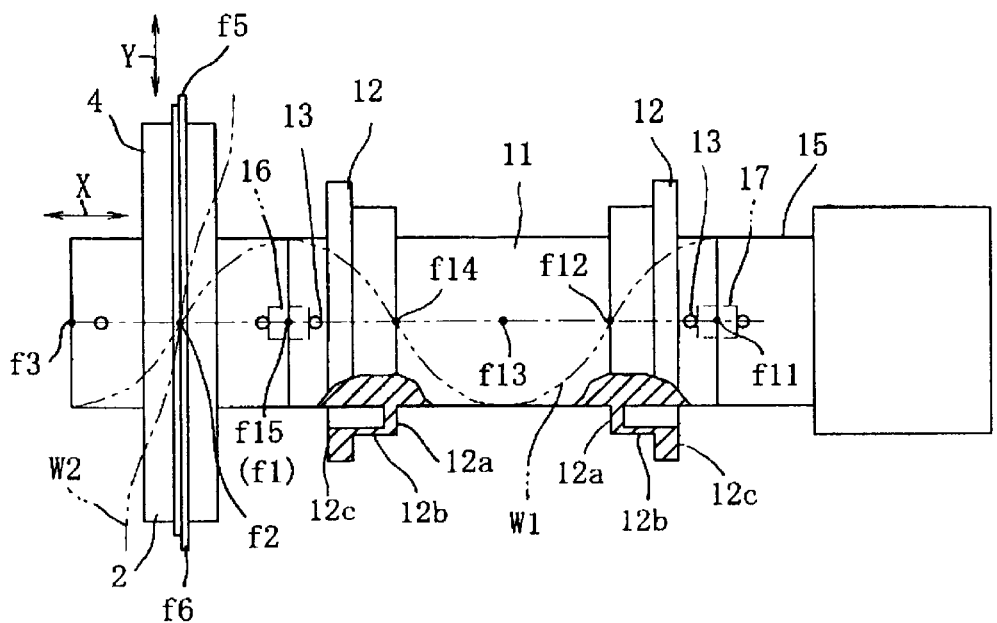
Figure 4:
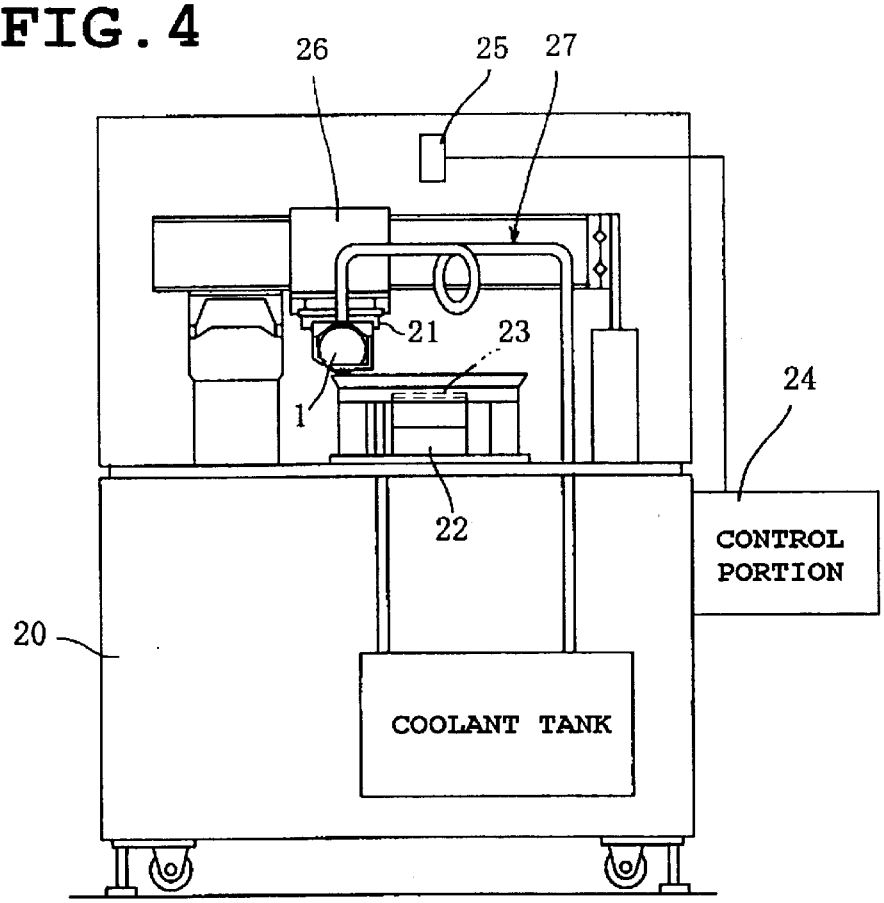

FIG. 1 is a side view showing a tool according to an embodiment of the present invention;

FIGS. 2(a) to 2(e) are process diagrams showing a method of producing the tool of the above embodiment;

FIG. 3 is a side view of a structure for connecting the tool of the above embodiment, a booster and a transducer; and FIG. 4 is a side view showing cutting using the tool of the above embodiment.

DETAILED DESCRIPTION OF THE PREFERRED EMBODIMENT

FIGS. 1 to 3 show an embodiment of the present invention. FIG. 1 shows the structure of an ultrasonic vibration cutting tool 1, FIG. 2 shows the method of producing the ultrasonic vibration cutting tool 1, FIG. 3 shows a structure for connecting the ultrasonic vibration cutting tool 1, a booster 11 and a transducer 15, and FIG. 4 shows ultrasonic vibration cutting.

The structure of the ultrasonic vibration cutting tool 1 will be described with reference to FIG. 1. The ultrasonic vibration cutting tool 1 comprises a resonator 2, a vibration conversion portion 3, a ring-shaped projection 4, a blade 5, tool mating portions 6, threaded holes 7 and the like.

The resonator 2 is made from aluminum which is one of the materials having excellent acoustic characteristics and has a length equal to the half of the wavelength of resonance frequency of ultrasonic vibration input from one end thereof. The maximum vibration amplitude points f1 and f3 of a vibration waveform W1 showing the instantaneous displacement (vibration amplitude) of ultrasonic vibration in an axial direction shown by an arrow X are existent at both ends of the resonator 2 and the minimum vibration amplitude point f2 of the vibration waveform W1 is existent at the center of resonator 2.

The vibration conversion portion 3 is shaped like a ring which projects outward from the peripheral surface of the resonator 2 at the minimum vibration amplitude point f2 of the vibration waveform W1 in such a manner that it is coaxial to the resonator 2. The vibration conversion portion 2 has a diameter larger than that of the resonator 2 and a width in an axial direction with the minimum vibration amplitude point f2 as the center and converts the transmission direction of vibration from an axial direction to a radial direction shown by an arrow Y. The instantaneous displacement (vibration amplitude) of ultrasonic vibration whose transmission direction has been converted to a radial direction is a vibration waveform W2. The maximum vibration amplitude points f6 and f5 of the vibration waveform W2 are existent on the peripheral side of the vibration conversion portion. f13 represents an average vibration point of the vibration waveform W2.

The ring-shaped projection 4 is shaped like a ring which projects outward from the peripheral surface of the vibration conversion portion 3 in such a manner that it is coaxial to the resonator 2. The ring-shaped projection 4 is dislocated from the position of the minimum vibration amplitude point f2 toward one side in an axial direction and has an outer diameter smaller than the outer diameter of the blade 5. The blade 5 is essentially composed of diamond, is provided at the minimum vibration amplitude point f2 and has a diameter larger than the vibration conversion portion 3. The peripheral surface of the blade 5 vibrates in a radial direction shown by the arrow Y. The vibration of the peripheral surface of the blade 5 in a radial direction is determined by the amount of projection from the vibration conversion portion 3. When the diameter of the blade 5 is too larger than the diameter of the vibration conversion portion 3, the peripheral surface of the blade 5 also vibrates in a direction shown by the arrow X. Therefore, the diameter of the blade 5 is set to a range that the edge of the blade 5 vibrates only in a direction shown by the arrow Y based on the diameter of the vibration conversion portion 3. The tool mating portions 6 are provided on the peripheral surface of the resonator 2 at positions where they do not interfere with the vibration conversion portion 3. The threaded holes 7 are formed in the interior side of the resonator 2 from the centers of the both end surfaces of the resonator 2.

Figure 2A:
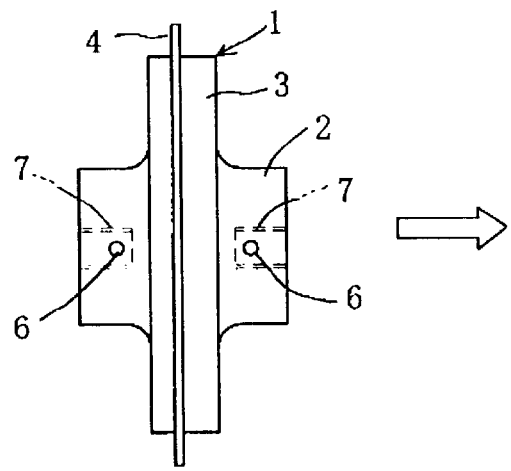

The method of producing the ultrasonic vibration cutting tool 1 will be described with reference to FIG. 2. In this production method, as shown in FIG. 2(a), the initial shape of the resonator 2 made from aluminum is first formed. The resonator 2 having this initial shape comprises the vibration conversion portion 3, ring-shaped projection 4, tool mating portions 6, threaded holes 7 and the like except the blade 5. As show in FIG. 2(b), the resonator 2 excluding the ring-shaped projection 4, that is, the resonator 2, vibration conversion portion 3, tool mating portions 6, threaded holes 7 and the like are marked with a masking member 10.

Figure 2B:
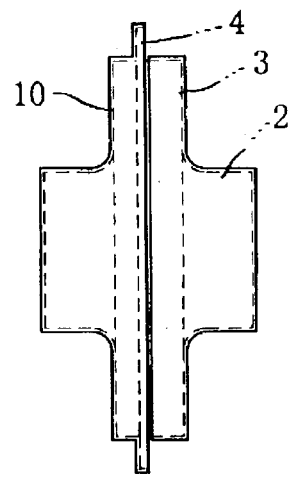
Figure 2B:
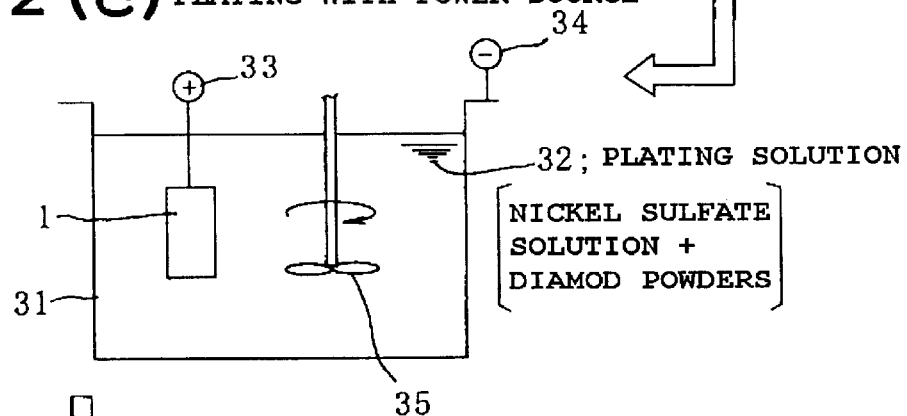
Figure 2D:
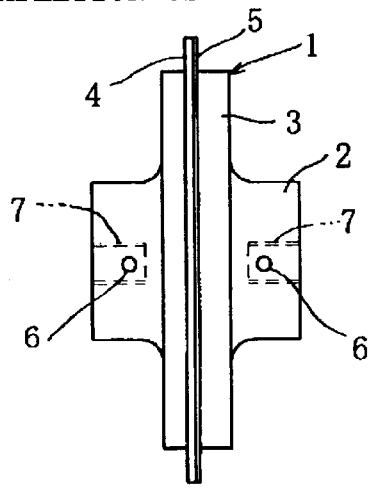

As shown in FIG. 2(c), the masked portions shown in FIG. 2(b) are placed in a plating tank 31 to grow the diamond blade 5 on the peripheral surface of the vibration conversion portion 3 with the ring-shaped projection 4 as a seed. The plating tank 31 is filled with a plating solution 32 prepared by mixing a nickel sulfate solution and diamond powders, the positive electrode 33 of a power source for plating is connected to a portion other than the blade growing portion of the ring-shaped projection 4, and the negative electrode 34 of the power source for plating is connected to the plating tank 31. The above masked portions shown in FIG. 2(b) are immersed in the plating solution 32 and the power source for plating is turned on while the plating solution 32 is stirred by rotary blades 35. The diamond powders contained in the plating solution 32 are grown on the peripheral surface of the vibration conversion portion 3 by this electrolytic plating method with the ring-shaped projection 4 as a seed as shown in FIG. 2(d) to form the blade 5 essentially composed of diamond, and the masking member 10 is removed. This grown blade 5 is located at the minimum vibration, amplitude point f2 shown in FIG. 1 and its thickness is. several microns to 200 microns, for example.

Figure 2E:
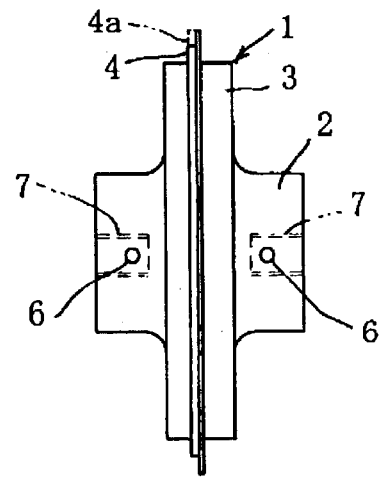

As shown in FIG. 2(e), after the growth of the blade 5, a portion other than the removed portions is covered with an unshown masking member, the peripheral portion 4a of the ring-shaped projection 4 is removed by aluminum etching so that the outer diameter of the ring-shaped projection 4 is set smaller than the outer diameter of the blade 5, and an ultrasonic vibration cutting tool 1 comprising the resonator 2 and the blade 5 which are integrated with each other as shown in FIG. 1 is obtained.

The constitution of the ultrasonic vibration cutting tool 1 used for ultrasonic vibration cutting will be described with reference to FIG. 3. A booster 11 is connected to one end of the resonator 2 by a headless screw 16, and a transducer 15 is connected to the other end of the booster 11 by a headless screw 17. The booster 11 is made from a material having excellent acoustic characteristics such as titanium, aluminum or hardened iron and has a length equal to the wavelength of resonance frequency of ultrasonic vibration transmitted from the transducer 15. The maximum vibration amplitude points f1 and f15 of the vibration waveform W1 are existent at both end portions of the booster 11. The booster 11 comprises front and rear support portions 12 and tool mating portions 13.

Each of the support portions 12 is shaped like a crank consisting of a thick root portion 12a, a thin portion 12b and a thick portion 12c. The root portion 12a is shaped like a ring which projects outward from the peripheral surface of the booster 11 in a radial direction at the minimum vibration amplitude point f12 or f14 of the booster 11. The thin portion 12b is shaped like a cylinder which projects in a direction parallel to an axial direction from the fringe of the root portion 12a. The thick portion 12c is shaped like a ring which projects outward in a radial direction from the end of the thin portion 12b. The crank shapes of the support portions 12 are bisymmetric to each other but may face the same direction. The tool mating portions 13 are provided on the peripheral surface of the booster 11 at positions where they do not interfere with the support portions 12.

Cutting using the ultrasonic vibration cutting tool 1 will be described with reference to FIG. 4. Cutting a semiconductor wafer 23 incorporating ICs as a member to be cut into a plurality of dice-like semiconductor chips called "bare chips" will be described hereinafter as an example. The booster 11 and the transducer 15 shown in FIG. 3 are installed in the ultrasonic vibration rotation unit 21 of an ultrasonic vibration cutting apparatus 20 in such a manner that they are coaxial to the ultrasonic vibration rotation unit 21, the front and rear support portions 12 shown in FIG. 3 of the booster 11 are fitted in the ultrasonic vibration rotary unit 21, and the vibration conversion portion 3, blade 5 and ring-shaped projection 4 shown in FIG. 1 of the ultrasonic vibration cutting tool 1 are located outside the ultrasonic vibration rotary unit 21. The semiconductor wafer 23 incorporating ICs as a member to be cut is fixed on the mounting table 22 of the ultrasonic vibration cutting apparatus 20. When an operator operates the unshown operation board of the ultrasonic vibration cutting apparatus 20 to instruct the controller 24 of the ultrasonic vibration cutting apparatus 20 to start cutting, the controller 24 instructs the CCD camera 25 of the ultrasonic vibration cutting apparatus 20 to start photographing. The CCD camera 25 outputs an image signal of the semiconductor wafer 23 on the mounting table 22 to the controller 24, the controller 24 outputs dislocation which is a computation result based on the image signal and reference image information to the mounting table 22, thereby completing the positioning of the semiconductor wafer 23 relative to ultrasonic vibration rotation unit 21. Thereafter, the controller 24 controls the ultrasonic vibration rotation unit 21 and the three-axis drive unit 26 of the mounting table 22, and the blade 5 rotates in one direction and draws a square locus by its linear movement in longitudinal, transverse and vertical directions while it resonates with ultrasonic vibration. The blade 5 cuts the semi conductor wafer 23 in one direction once by drawing one square locus. The semiconductor wafer 23 is cut into a plurality of belt-like pieces by repeating the movement of the three-axis drive unit 26 along the square locus. When cutting into a plurality of belt-like pieces is completed, the controller 24 instructs the mounting table 22 to rotate 90° by activating the control function of the mounting table 22, thereby changing the angle of the semiconductor wafer 23 with respect to the ultrasonic vibration rotation unit 21 by 90°. In this state, the controller 24 resumes the control of the three-axis drive unit 26 to enable blade 5 to further cut the belt-like pieces of the semiconductor wafer 23 into a plurality of dices, thereby completing the cutting work of one semiconductor wafer 23 by ultrasonic vibration rotation. In the above step of cutting the semiconductor wafer 23, the blade 5 is cooled by the cooling system 27 of the ultrasonic vibration cutting apparatus 20.

In the above embodiment, the semiconductor wafer is used as a member to be cut. The member to be cut may be a sticky and soft member made from gold, silver, aluminum, solder or copper, a hard and fragile member made from ceramic, silicon or ferrite, or a laminate structure consisting of a synthetic resin and a metal, or a laminate structure consisting of an inorganic material, metal and synthetic resin.

In the above embodiment, the ring-shaped projection 4 and the blade are located at the minimum vibration amplitude point f2. The ring-shaped projection 4 and the blade may be dislocated from the minimum vibration amplitude point f2 if they are on the peripheral surface in an axial direction of the vibration conversion portion 3. The reason for this is that the vibration amplitude of ultrasonic vibration converted to a radial direction shown by the vibration waveform W2 is the same at any portion of the peripheral surface of the vibration conversion portion 3.

What is claimed is:

1. A method of producing an ultrasonic vibration cutting tool comprising the steps of:

masking a resonator, having a vibration conversion portion and a ring-shaped projection, with a masking member excluding a portion of the ring-shaped projection on which a blade is to be formed;

immersing the resonator in a plating solution containing diamond powders;

growing a blade essentially composed of diamond with the ring-shaped projection as a seed by electroplating; and removing a peripheral portion of the ring-shaped projection by etching.

2. The method of producing an ultrasonic vibration cutting tool according to claim 1, wherein the peripheral portion of the ring-shaped projection is removed after the growth of the blade so that the ring-shaped projection is located inside a peripheral portion of the blade.

3. A method of producing an ultrasonic vibration cutting tool comprising the steps of:

immersing a resonator having a vibration conversion portion and a ring-shaped projection in a plating solution containing diamond powders; and growing a blade essentially composed of diamond with the ring-shaped projection as a seed by electroplating, wherein a peripheral portion of the ring-shaped projection is removed after the growth of the blade so that the ring-shaped projection is located inside a peripheral portion of the blade.

* * * * *